Oct. 26, 1965       R. V. SMITH ETAL       3,214,705
UNITY GAIN PREAMPLIFIER FOR PHOTOMULTIPLIER TUBES
Filed July 18, 1962       2 Sheets-Sheet 1

INVENTORS.
RAYMOND V. SMITH
JOSEPH B. REGAN
BY
George C. Sullivan
         Agent INVENTORS.
RAYMOND V. SMITH
JOSEPH B. REGAN
BY
George C. Sullivan
Agent

United States Patent Office 3,214,705
Patented Oct. 26, 1965

---

3,214,705
UNITY GAIN PREAMPLIFIER FOR PHOTOMULTIPLIER TUBES
Raymond V. Smith, Los Altos, and Joseph B. Reagan, San Jose, Calif., assignors to Lockheed Aircraft Corporation, Burbank, Calif.
Filed July 18, 1962, Ser. No. 210,797
10 Claims. (Cl. 330—17)

The present invention relates to a unity voltage-gain preamplifier and more particularly to a unity voltage-gain preamplifier which is used in conjunction with high-gain photomultiplier tubes.

In order to more fully appreciate the unique features of the present invention, it is advantageous to consider the operation of a photomultiplier tube when used for detecting nuclear radiation and the like. During operation of a photomultiplier tube, a particle will strike the photomultiplier scintillator which emits light. This light is transmitted to the photocathode of the photomultiplier tube which emits electrons. The number of electrons emitted are relatively few and are accelerated by the field created by the differential potential between the photocathode and the immediately adjacent grid. The first dynode further accelerates and attracts these electrons and upon their collision therewith result in the release of a greater number of electrons which is some multiple of the number of the colliding electrons. This multiplication of electrons is continued by the remaining dynodes and are finally collected upon the anode of the photomultiplier tube. A single proton striking a plastic scintillator will finally result in a charge being developed on the anode over the extremely short time period of about 3 nanoseconds ($10^{-9}$ seconds).

Although the voltage is relatively large, when considered as an open circuit, the charge developed on the anode of the photomultiplier tube is very small. Since the charge is small, the current available to drive subsequent electronic equipment is not adequate. In order to drive subsequent electronic equipment it is necessary to have a signal of relatively large voltage, relatively large current and of a relatively long time duration.

From the relationship $$V = \frac{Q}{C}$$

where Q is the charge developed on the anode, C is the capacitive coupling of the anode to ground and V is the voltage developed at the anode, it can be seen that to maintain an adequate voltage V, it is necessary to have a small capacitive coupling C since Q is very small.

From the relationship $T=RC$, where R is the resistance through which the current stored on the capacitive coupling C is discharged and T is the time duration for discharge, it can be seen that to obtain a relatively long time duration T, it is necessary that the resistance R be very large since, as pointed out above, it is necessary that C be very small to obtain an adequate anode voltage V.

The unity voltage gain current amplifier of the present invention maintains and adequate anode voltage V and provides a large current amplification and a relatively long time duration T. Absolute minimum capacitive coupling C (which is necessary to obtain adequate voltage V) is accomplished by the complete elimination of any capacitors and utilizing only the stray capacitive coupling of the photomultiplier tube to ground and the inherent capacitive coupling of the preamplifier to ground. Large resistance R is obtained by the utilization of a regenerative feedback circuit.

There are several problems associated with the current amplification of the output of photomultiplier tubes when used to detect particles and these problems include high input resistance, extremely fast time response, preamplifier saturation with excessive pulse rates and the realization of minimum capacitance.

As previously explained, the time duration over which the anode is being charged is extremely small and it is mandatory that the time duration be extended such that spectrum analyzing electronics may record the signal. From the above equations it can be seen that to obtain a relatively long pulse width (for example, one microsecond) the inherent preamplifier input capacitance must be a minimum and the input resistance must be a maximum. It has been found necessary that the preamplifier input resistance, to provide adequate pulse widths, must be of the order of several hundred kilohms. Conventional transistor amplifiers are only of the order of several kilohms.

The high input impedance of the preamplifier of the present invention has been accomplished by the utilization of a pair of extremely high beta and high speed complementary transistors wherein the output current of the preamplifier is fed back into the input which achieves an input impedance greater than one megohm. With an input impedance of this order of magnitude it is possible to obtain flexibility in pulse width by shunting the input by means of a predetermined resistance. Not only does this circuit provide considerable flexibility as to obtaining predetermined pulse widths, but the circuit is less dependent on the variation of transistor input characteristics with temperature.

The preamplifier of the present invention is uniquely adaptable for use in coupling the photomultiplier pulses to spectrum analyzing electronics by means of a low impedance coaxial cable. This is predicated on the extremely low output impedance of the preamplifier which is of the order of 10 ohms. As a result, it is possible to readily match the impedance of the coaxial transmission line with the effective output impedance of the preamplifier. In view of the low impedance characteristics of the preamplifier, different cables having variations of impedance and lengths may be employed and a near perfect match with the effective impedance of the coaxial cable may be readily accomplished by the utilization of a predetermined series resistor at the output of the preamplifier.

A problem frequently encountered in the preamplification of the output of photomultiplier tubes is the preamplifier may become saturated if the pulse rate becomes either excessively rapid or excessively large. This saturation characteristic is obviated in the present invention by the unique implementation of a diode network.

Accordingly, an object of the present invention is to provide a preamplifier which is compatible with photomultiplier tubes.

Another object is to provide a preamplifier which has a high input impedance and a low output impedance for coupling a photomultiplier tube to spectrum analyzing electronics.

Still another object of the present invention is to provide a preamplifier which does not oscillate when a pulse having an extremely short rise time is applied to the input thereof.

A further object of the present invention is to provide a preamplifier which does not saturate when an excessively large input signal is applied thereto and is therefore able to accurately reproduce an immediately following signal.

A still further object of the present invention is to use only the inherent capacitance of the photomultiplier tube to store the charge developed on the anode of the photomultiplier tube.

A still further object of the present invention is to discharge the stored charge through a high input impedance preamplifier and through a variable shunting resistor.

A still further object of the present invention is to provide a technique wherein the output coupling capacitor of the preamplifier is maintained at its original reference level irrespective of the rapidity of the rate of amplified pulses.

The specific nature of the invention, as well as other objects, uses and advantages thereof, will clearly appear from the following description and from the accompanying drawings in which.

Figure 1:
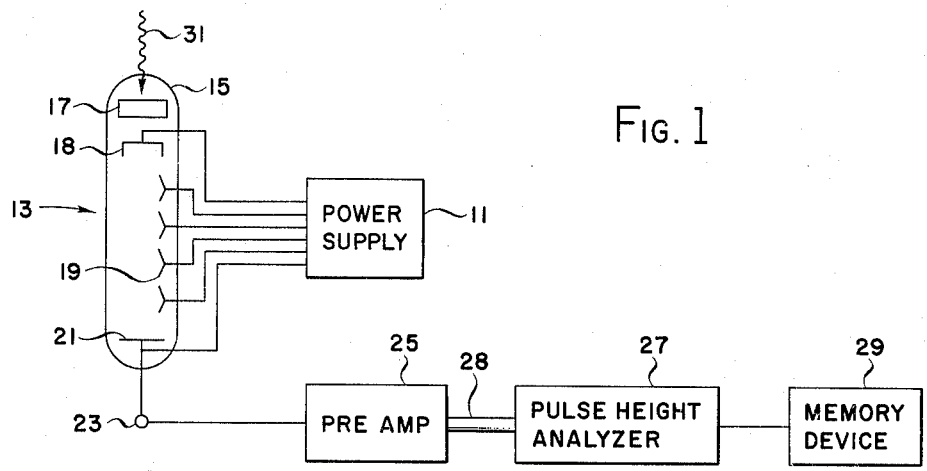
FIGURE 1 is a schematic illustration of the over-all radiation detecting technique of which the preamplifier of the present invention is an integral part.

In FIGURE 1 is schematically illustrated the over-all radiation detecting technique in which the preamplifier of the present invention is an integral part. This over-all system includes power supply 11 having a plurality of D.-C. voltage outputs which are operatively connected to photomultiplier tube 13. Photomultiplier tube 13 consists of an envelope 15, plastic scintillator 17, cathode 18, dynodes 19 and anode 21. The output or anode of the photomultiplier tube is connected to terminal 23, which is in turn connected to the input of preamplifier 25 of the present invention. The output of the preamplifier is connected to the input of pulse height analyzer 27 by means of coaxial cable 28 and the output of the pulse height analyzer is then transmitted to memory device 29.

As previously explained, a proton particle, indicated by arrow 31, strikes plastic scintillator 17 which emits light which impinges upon cathode 18 which in turn emits electrons which are multiplied by means of dynodes 19 which are then collected or stored on anode 21. The time duration of this charging process on anode 21 is extremely short (of the order of 3 nanoseconds) and it is therefore necessary that the time duration be extended by a considerable amount such that it may be analyzed by pulse height analyzer 27 and subsequently transmitted to a memory device 29. Typical voltages which are encountered at anode 21 range from about zero to 10 or 11 volts. For accurate pulse height analysis it is necessary that the peak voltage be exactly reproduced at the output of the preamplifier.

Figure 2:
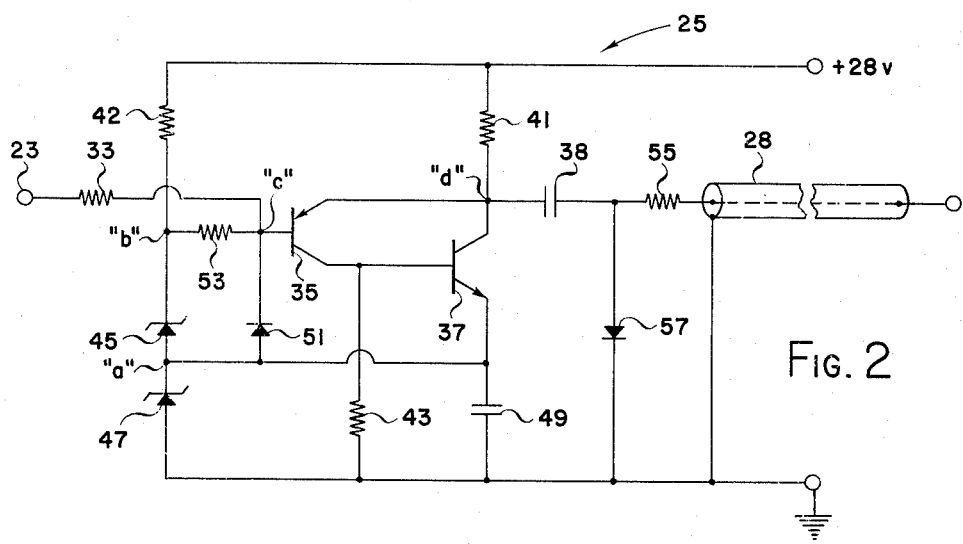
FIGURE 2 is a schematic illustration of the preamplifier of the present invention.

In FIGURE 2 is schematically illustrated preamplifier circuit 25 of the present invention. This circuit consists of input terminal 23 which is connected in series through resistor 33 to the base of PNP transistor 35. The collector of transistor 35 is connected to the base of transistor 37 (which is of the NPN type) and the collector of transistor 37 is connected to one side of capacitor 38 and to the emitter of transistor 35. The D.-C. operating conditions of the transistors of preamplifier 25 are primarily determined by resistors 41, 42 and 43 and by zener diodes 45 and 47. Zener diode 47 determines the emitter voltage of transistor 37 and zener diode 45, in conjunction with zener diode 47, determines the base voltage of transistor 35. The primary function of resistor 42 is to limit the current through zener diodes 45 and 47 and to set the zener point of the zener diodes. Capacitor 49 is parallel coupled with zener diode 47 to ground in order to avoid degeneration of the signal. That is, capacitor 49 is a direct A.-C. couple of the emitter of transistor 37 to ground.

As will hereinafter become apparent, the function of diode 51 is to limit the operation of the preamplifier to its linear regions and to make it possible to accurately reproduce a pulse which very rapidly follows a large pulse which would otherwise saturate transistor 35. In addition, the function of resistor 53, which is in parallel with the input impedance of transistors 35 and 37 to ground, is to provide a predetermined pulse width at the output of the preamplifier. Resistors 41 and 43 determine the currents which pass through transistors 37 and 35, respectively, under D.-C. conditions, and respectively limit their currents to approximately 2.8 milliamps and .5 milliamp.

The signal output from the preamplifier is transmitted through coupling capacitor 38 which is connected in series with coaxial cable 28 through resistor 55. Diode 57 is connected between capacitor 38 and resistor 55 to ground. The interrelationship between capacitor 38, diode 57, resistor 55, coaxial cable 28 and transistor 37 will hereinafter be explained in conjunction with the description of operation of the preamplifier.

In order to more clearly set forth the operation of the present invention, the following tabulation of the values of the components employed therein will be of assistance. It is to be understood that these values are considered to be only representative of a typical embodiment of the present invention and substantial departure therefrom may be made and still remain within the scope of the present invention.

| Component: | Values |
|---|---|
| 28 | 50 ohms, 3946. |
| 33 | 100 ohms. |
| 35 | 2N779A. |
| 37 | 2N834. |
| 38 | 1 microfarad, 35 volts. |
| 41 | 3,600 ohms. |
| 42 | 3,000 ohms. |
| 43 | 10,000 ohms. |
| 45 | IN765, 10.5 volts. |
| 47 | IN705, 5 volts. |
| 49 | 1 microfarad, 35 volts. |
| 51 | FD, 189. |
| 53 | 1K to 300K ohms. |
| 55 | 50 to 100 ohms. |
| 57 | FD, 189. |

*Operation*

From the value of components set forth in the above tabulation it can be seen that the voltage at point "a" is 5 volts, as established by zener diode 47, and the voltage at point "b" is 15.5 volts, as established by zener diodes 45 and 47. During steady state condition the voltage at point "c" will be 15.5 volts. The base voltage at point "c" will establish the emitter voltage of transistor 35 at about 16 volts (point "d"). Since the emitter of transistor 37 is clamped at 5 volts, the base voltage of transistor 37 will be about 5.5 volts.

In the complementary feedback circuit set forth in FIGURE 2 it will be noted that the signal amplitude is reduced by only the base emitter drop of transistor 37 which is only about 0.3 volt or the germanian transistor. This is to be compared with about a 1.2 volt drop in a typical circuit such as, for example, a Darlington type circuit. In addition, the leakage current of transistors 35 and 37 are in opposite direction for each transistor and hence the leakage cannot flow in series through both transistors and thereby reduce the input impedance. Considering now the details of the present complementary transistor feedback network, it should be noted that a voltage is developed instantaneously (3 nanoseconds) across the stray capacitance, due to the photomultiplier anode current, which then decays primarily through resistor 53 towards ground. Because transistor 35 only supplies current to resistor 43 and to the base of transistor 37, its base current requirement is very little. The base current requirement of transistor 37 is insignificant compared to the load resistance of resistor 43. A negative signal with respect to the base of transistor 35 (which is D.-C. coupled to 10.5 volts through the zener diodes) causes current to flow in transistor 35 but since the voltage across resistor 43 in fixed and established by zener diode 47 and the constant base collector voltage of transistor 37, no more current flows through resistor 43. Hence the signal current flows into transistor 37. This current is in the proper direction to cause transistor 37 to conduct more heavily and the significant voltage drop would occur across resistor 41 (i.e., voltage gain) if the collector of transistor 37 would not clamp to the emitter of transistor 35. The emitter follower action of transistor 35 prevents the voltage at the collector of transistor 37 from changing and therefore the additional current flows into the load without any voltage gain. This provides considerable stability to the circuit since the current requirement at the base of transistor 35 varies very little because all of the current in transistor 35 and transistor 37 is in a closed loop configuration. In addition, the fact that the whole preamplifier between the photomultiplier and between the transistors is D.-C. coupled also provides great stabilities since there is no time constant which results in instability.

Figure 3:
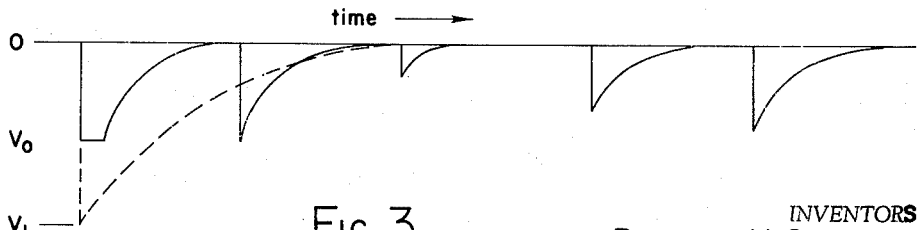
FIGURE 3 is a curve illustrating the voltage at the input and output during typical operation.

In FIGURE 3 is illustrated a family of curves which are indicative of the voltage at points "c" and "d" during typical operation. Each of these curves is the result of a nuclear particle striking the scintillator of the photomultiplier tube and collected at the anode thereof. It will be appreciated that the voltage magnitude will be a function of the energy of the particle, as well as other factors, and in many instances these particles will be striking a scintillator in very rapid succession. In certain instances a particle would create a voltage on the photomultipler anode equivalent to $V_1$ of FIGURE 3 as indicated by the dotted line. However, a voltage of this magnitude would have a large decay time and, as a result, it would not be possible to accurately measure the magnitude of a subsequently occurring particle if it occurred during this decay period. In order to obviate this undesirable condition, diode 51 of FIGURE 2 is employed to shunt the charge developed at the anode of the photomultiplier, as well as point "c" of FIGURE 2, when it exceeds a predetermined value, for example, $V_o$. Using the circuit parameters set forth above, diode 51 conducts when the anode, or the voltage at point "c," exceeds 10.5 volts. This can be seen from the fact that diode 51 is back biased by 15.5 volts appearing at point "c" and 5 volts appearing at point "a." As illustrated in FIGURE 3, the voltage $V_o$ will remain constant for a finite period of time prior to its exponential decay when the anode voltage exceeds 10.5 volts. By employing this technique, the immediately following pulse will not have superposed thereupon a charge from the immediately preceding pulse.

Figure 4:
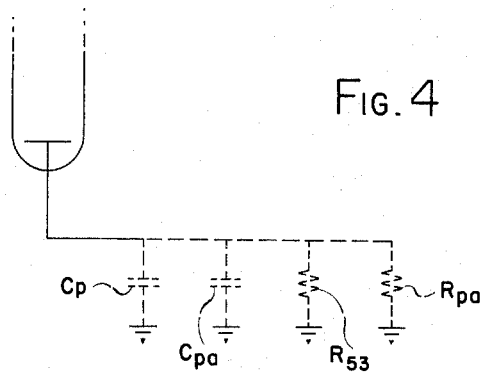
FIGURE 4 is a schematic illustration of the equivalent R-C circuit of the preamplifier shown in FIGURES 1 and 2.

In FIGURE 4, is illustrated the equivalent circuit of the present invention wherein $C_p$ represents the stray capacitance of the photomultiplier tube, $C_{pa}$ represents the effective capacitance of the preamplifier, $R_{53}$ represents the resistance of resistor 53, and $R_{pa}$ represents the effective input resistance of the preamplifier. From the relationship $$V = \frac{Q}{C}$$

it can be seen that the anode voltage will be maintained at a maximum by the utilization of minimum capacitance since the charge Q is fixed by the particle and the inherent characteristics of the photomultiplier tube.

Figure 5:
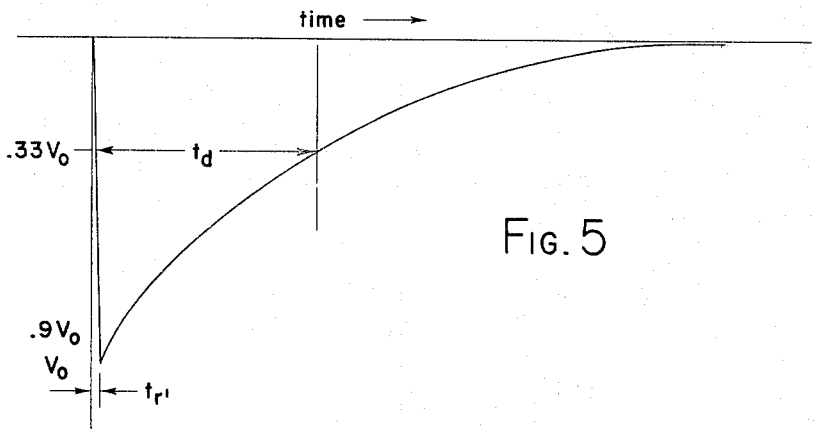
FIGURES 5 and 6 are curves illustrating the rise and decay characteristics of the preamplifier.

As previously indicated, it is mandatory that the time duration of the output pulse, appearing at point "d" of the preamplifier, be of the order of at least one microsecond for many applications. The exponential decay of the equivalent circuit set forth in FIGURE 4 may be represented by the relationship $T=RC$ where R is the effective resistance of $R_{53}$ and $R_{pa}$ and C repsents the effective capacitance of $C_p$ and $C_{pa}$. It can therefore be seen that to have a long exponential time decay, in view of the extremely small capacitance of $C_p$ and $C_{pa}$ which is necessary to obtain an adequate voltage V, that the input impedance $R_{pa}$ be extremely large. By the utilization of the transistor feedback circuit set forth in FIGURE 2, it has been found possible to obtain an input impedance of as high as one megohm. The time constant, as denoted as $T_d$ in FIGURE 5 (which is conventionally taken at $0.37v_o$), may be adjusted to any predetermined value by selecting a predetermined value for resistor 53.

In view of the foregoing, it can be seen that an exponentially decaying voltage will appear at point "d" of FIGURE 2 without the utilization of conventional RC circuitry at the input of the preamplifier, but rather, what is employed to obtain this exponential relationship is the inherent stray capacitance and input impedance characteristics of the preamplifier. It has been found absolutely necessary to resort to techniques of this type to handle the extremely small charges which are obtained at the anode of photomultiplier tubes.

Figure 6:
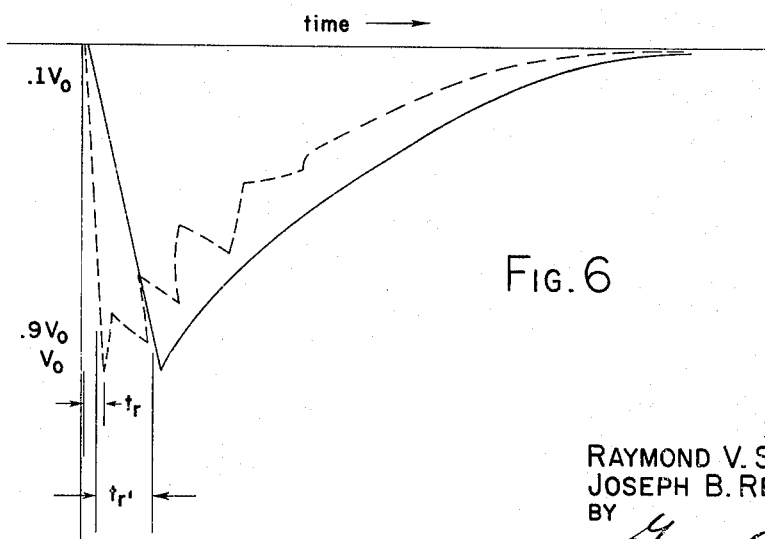

Contrary to conventional practice, resistor 33 of FIGURE 2 is used in series with the base of transistor 35. Resistor 33 is critical to the operation of the circuit of the present invention in view of the extremely short rise time, $t_r$ as depicted in FIGURE 6. The rise time of the anode of the photomultiplier tube is of the order of 3 nanoseconds ($1 \times 10^{-9}$ seconds=1 nanosecond) wherein the feedback response time of the preamplifier is of the order of 10 nanoseconds. This being the case, the feedback signal occurring at the emitter of transistor 35 would be out of phase with the signal occurring at the base and there would be a resulting systems oscillation which is indicated by the dotted line of FIGURE 6. It has been found that the rise time may be delayed to 10 nanoseconds (as indicated by $t_{r'}$ of FIGURE 6) by the utilization of a relatively small resistor, resistor 33, in series with the base of transistor 35. By delaying the rise time in this manner, the base signal will be in phase with the emitter signal and there will be no systems oscillations and a smooth exponentially decaying curve will result as indicated by the solid line of FIGURE 6. In order to more clearly show the function of resistor 33, times $t_r$ and $T_{r'}$ of FIGURE 6 are considerably exaggerated. A more realistic relationship is set forth in FIGURE 5 wherein the rise time $t_{r'}$ is quite small with relation to the decay time $t_d$. In actual practice $t_{r'}$ is of the order of magnitude of 10 nanoseconds and $t_d$ is of the order of one microsecond and $V_o$ is equal to about 10.5 volts. Time constants $t_d$ of between 0.5 microsecond and 10 microseconds have been found possible by the utilization of resistor 53 having 50 K. ohms and 1 megohm, respectively.

In summary, the function of resistor 33 is to delay the rise time of the input signal such that the preamplifier does not enter into oscillation. The function of diode 51 is to shunt the input signal to ground when it is about equal to the saturation voltage of the preamplifier. In this manner the preamplifier is operated in its linear region and large charging is not obtained in the equivalent circuit shown in FIGURE 4. Therefore, it is possible to accurately reproduce a pulse that occurs immediately following a pulse which would otherwise saturate the system.

It has been discovered that capacitor 38 will not restore to its original level prior to the occurrence of the next pulse when the rate of pulses becomes very rapid. As a result there is a D.-C. offset on capacitor 38. To obviate this condition, diode 57 is employed such that there is a low impedance recharge path for capacitor 38. However, the inverse impedance of diode 57 is very large with respect to the signal and there will be virtually no signal distortion due to its presence.

In view of the extremely low output impedance of the preamplifier, which is of the order of 10 ohms, it is possible to obtain optimum matching of the input impedance of the coaxial cable with the output impedance of the preamplifier. For example, if the coaxial cable had an impedance of 10 ohms, resistor 55 would be deleted and there would be a resulting 10 ohm output impedance which would perfectly match the impedance of the coaxial cable. When the impedance of the coaxial cable increases, resistor 55 is employed such that the sum of the output impedance of the preamplifier and the resistance of resistor 55 is equal to the impedance of the coaxial cable.

In view of the foregoing, it can be seen that a unity voltage gain preamplifier is provided which is capable of amplification of extremely rapid rise time input pulses and is capable of extending these pulses over a relatively large time duration. Furthermore, this preamplifier accomplishes this with extreme simplicity by the utilization of the inherent capacitive and impedance characteristics of the photomultiplier and the preamplifier to which it is connected.

It is to be understood in connection with this invention that the embodiment shown is only exemplary, and that various modifications can be made in construction and arrangement within the scope of the invention as defined in the appended claims.

What is claimed is:

1. An amplifier comprising:
 (a) an input terminal,
 (b) an input network having stray capacitance,
 (c) an output terminal
 (d) first and second transistors, each having a base, an emitter and a collector, the collector of said first transistor connected to the base of said second transistor,
 (e) the collector of said second transistor being connected to the emitter of said first transistor in a regenerative feedback arrangement,
 (f) means coupling said second transistor to said output terminal,
 (g) means connecting said input terminal to the base of said first transistor,
 (h) said connecting means including means for applying a signal to said base of said first transistor in phase with the regenerative feedback signal applied to the emitter of said first transistor,
 (i) said applying means including said input network having a resistance and said stray capacitance for delaying the rise time of the signal applied to said base of the first transistor.

2. An amplifier as defined in claim 1 further including a diode operatively connecting the base of said first transistor to ground, means back biasing said diode to a predetermined voltage, whereby said diode shunts the signal transmitted from said input network to ground when said signal is greater than said predetermined voltage.

3. An amplifier as defined in claim 1 further including a diode interconnecting the base of said first transistor to ground thereby providing a current path for allowing discharge of the charge stored in said input network over a predetermined period of time.

4. An amplifier as defined in claim 1 wherein said first transistor is of the PNP type and said second transistor is of the NPN type.

5. An amplifier as defined in claim 1 wherein the collector of said second transistor is coupled to said output terminal through a first capacitor, the emitter of said second transistor being connected through a second capacitor to ground.

6. An amplifier as defined in claim 1 wherein the collector of the second transistor is connected to one side of a capacitor, and the diode connecting the other side of said capacitor to ground.

7. An amplifier as defined in claim 1 further including a second resistance and a diode connected in parallel and connecting the base of said first transistor to ground.

8. An amplifier as defined in claim 7 wherein said second resistance having one side connected to the base of said first transistor and the other side connected to a first zener diode, said first zener diode connected to one side of a second zener diode, the other side of a second zener diode connected to ground.

9. A unity voltage gain current amplifier comprising a PNP transistor, an NPN transistor, an input terminal, a first resistor interconnecting said input terminal and the base of said PNP transistor, the collector of said PNP transistor connected to the base of said NPN transistor, the collector of said NPN transistor connected to the emitter of said PNP transistor and through a first capacitor to an output terminal, the emitter of said NPN transistor connected through a second capacitor to ground and through a first zener diode to ground, the base of said PNP transistor series connected through a second resistor, a second zener diode and said first zener diode to ground, the base of said PNP transistor also series connected through a diode and said first zener diode to ground and a fixed voltage power source connected to the common junction of said second resistor and said second zener diode and to the common junction of the emitter of said PNP transistor and the collector of said NPN transistor.

10. A unity gain current amplifier comprising a PNP transistor, an NPN transistor, an input terminal, a first resistor interconnecting said input terminal and the base of said PNP transistor, the collector of said NPN transistor connected to the emitter of said PNP transistor and to one side of a capacitor, a first diode connecting the other side of said capacitor to ground, a second resistor and a second diode connected in parallel and connecting the base of said PNP transistor to ground and means for establishing the steady state operating points of said PNP and NPN transistors.

References Cited by the Examiner

UNITED STATES PATENTS

| 2,892,165 | 6/59 | Lindsay | 330—24 |
| 3,015,033 | 12/61 | Muench | 250—207 |
| 3,025,404 | 3/62 | Betzold et al. | 260—207 |
| 3,069,552 | 12/62 | Thomson | 330—59 |
| 3,073,969 | 1/63 | Skillen | 330—24 |
| 3,093,740 | 6/63 | Bush | 250—207 |

OTHER REFERENCES

Army Technical Manual, TM11–690, March 1959, pp. 98–100 relied on.

ROY LAKE, *Primary Examiner.*

Disclaimer and Dedication 3,214,705.—*Raymond V. Smith*, Los Altos, and *Joseph B. Reagn*, San Jose, Calif. UNITY GAIN PREAMPLIFIER FOR PHOTOMULTIPLIER TUBES. Patent dated Oct. 26, 1965. Disclaimer and dedication filed Oct. 29, 1973, by the assignee, *Lockheed Aircraft Corporation*.

Hereby disclaims and dedicates said patent to the People of the United States.

[*Official Gazette February 19, 1974.*]